United States Patent
Takahashi et al.

(10) Patent No.: US 10,422,354 B2
(45) Date of Patent: Sep. 24, 2019

(54) HYDRAULIC ACCUMULATOR AND MANUFACTURING METHOD THEREOF

(71) Applicants: DENSO CORPORATION, Kariya, Aichi-pref. (JP); HONDA MOTOR CO., LTD., Tokyo (JP)

(72) Inventors: Kyohei Takahashi, Kariya (JP); Tatsuya Kitanaka, Kariya (JP); Itsuki Shimazaki, Wako (JP); Shunsuke Yoshida, Wako (JP); Yoshiatsu Asai, Wako (JP)

(73) Assignees: DENSO CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 15/915,245

(22) Filed: Mar. 8, 2018

(65) Prior Publication Data

US 2018/0283408 A1    Oct. 4, 2018

(30) Foreign Application Priority Data

Mar. 28, 2017    (JP) .................................. 2017-63222

(51) Int. Cl.
*F16L 55/053*    (2006.01)
*F15B 1/24*    (2006.01)

(52) U.S. Cl.
CPC ............ *F15B 1/24* (2013.01); *F15B 2201/21* (2013.01); *F15B 2201/31* (2013.01); *F15B 2201/605* (2013.01); *F16L 55/053* (2013.01)

(58) Field of Classification Search
CPC . F16L 55/053; F16L 55/045; F16L 2201/205; F16L 2201/312; F15B 2201/21; F15B 2201/31

USPC .............................................. 138/31, 30, 26
See application file for complete search history.

(56) References Cited

U.S. PATENT DOCUMENTS

| | | | | |
|---|---|---|---|---|
| 5,735,314 A | * | 4/1998 | Alaze ..................... | B60T 8/4068 138/31 |
| 6,390,133 B1 | * | 5/2002 | Patterson .............. | B60T 8/3615 138/30 |
| 7,971,608 B2 | * | 7/2011 | Crimpita ................. | B60T 17/06 138/26 |
| 8,474,488 B2 | * | 7/2013 | Ryu ........................ | B60T 7/102 138/30 |
| 2003/0205283 A1 | * | 11/2003 | Maloney ................... | B60T 8/34 138/31 |

FOREIGN PATENT DOCUMENTS

| | | |
|---|---|---|
| JP | 2005-207571 | 8/2005 |
| JP | 4645389 | 12/2010 |
| JP | 2016-169768 | 9/2016 |

* cited by examiner

*Primary Examiner* — Patrick F Brinson
(74) *Attorney, Agent, or Firm* — Nixon & Vanderhye P.C.

(57) ABSTRACT

A hydraulic accumulator includes a limiting portion that is fitted into a ring end gap of a snap ring to limit a decrease in a diameter of the snap ring. The snap ring is stamped from a metal sheet by a press machine. Therefore, one of two opposed surfaces of a portion of the snap ring, which is fitted into a groove, forms a sloped surface as a result of shear droop. The limiting portion is fitted into the ring end gap of the snap ring to limit the decrease in the diameter of the snap ring. Thus, it is possible to limit riding of the sloped surface of the snap ring on a corner of the groove, and thereby it is possible to limit removal of the snap ring from the groove.

5 Claims, 19 Drawing Sheets

HYDRAULIC ACCUMULATOR AND MANUFACTURING METHOD THEREOF

CROSS REFERENCE TO RELATED APPLICATION

This application is based on and incorporates herein by reference Japanese Patent Application No. 2017-63222 filed on Mar. 28, 2017.

TECHNICAL FIELD

The present disclosure relates to a hydraulic accumulator that is connected to an oil passage, which is configured to supply an oil pressure to friction elements of a transmission of a vehicle.

BACKGROUND

A known hydraulic accumulator includes a housing, a cover, a piston and a spring (see, for example, JP2016-169768A).

The housing includes a tubular portion, which opens at one axial end side. The cover closes the tubular portion at the one axial end side. The piston is received in an inside of the tubular portion in a manner that enables movement of the piston in an axial direction. The piston forms an oil pressure chamber, which accumulates the oil pressure, at the other axial end side, which is opposite from the one axial end side. The spring is interposed between the cover and the piston to urge the piston toward the other axial end side.

In this hydraulic accumulator, the cover is urged by the spring toward the one axial end side. Therefore, it is necessary to limit removal (detachment) of the cover from the tubular portion. In view of the above point, there is also known a structure that holds the cover, which is urged by the spring, through use of a snap ring by fitting the snap ring in a circumferential groove that is formed in an inner peripheral wall of the tubular portion.

The removal limiting structure, which limits the removal of the component through use of the snap ring, is also known in other technical fields, which is other than the technical field of the hydraulic accumulator discussed above.

For example, in a case of a starter that starts an internal combustion engine, there is a known structure that holds a load, which is exerted from an armature to a motor output shaft (armature shaft) in a thrust direction, through use of a snap ring that is installed to an outer peripheral wall of the motor output shaft (see, for example, JP4645389B2). Furthermore, in a case of a ball bearing installed to a vehicle, there is a known structure that holds a load, which is exerted from an outer race member of the ball bearing in a thrust direction, through use of a snap ring that is installed to an inner peripheral wall of a vehicle side component, to which the outer race member of the ball bearing is press fitted (see, for example, JP2005-207571A).

In general, in the structure, which limits the removal (detachment) of the component through use of the snap ring, it is necessary to limit removal of the snap ring from the corresponding groove since the snap ring limits the removal of the component through the fitting of the snap ring in the groove. With respect to this point, in the removal limiting structure of JP2016-169768A, the groove is formed at the outer peripheral wall of the cover, and the snap ring is fitted into this groove to limit removal of the snap ring from the groove. Furthermore, in the removal limiting structure of JP4645389B2, an element, which circumferentially clamps two end portions of the snap ring that forms a ring end gap therebetween, is installed to limit an increase in a diameter of the snap ring and thereby to limit removal of the snap ring from the groove.

However, in the case of the removal limiting structure of JP2016-169768A, in order to fit the inner peripheral portion and the outer peripheral portion of the snap ring into the groove of the tubular portion and the groove of the cover, respectively, a complicated assembling work may be required, so that implementation of the removal limiting structure of JP2016-169768A is difficult. Furthermore, the removal limiting structure of JP4645389B2 limits the increase in the diameter of the snap ring. In contrast, in the hydraulic accumulator, the snap ring is installed to the inner peripheral wall of the tubular portion. Therefore, in the case of the hydraulic accumulator, there is no possibility of increasing of the diameter of the snap ring. Rather, there is a possibility of removal of the snap ring through a decrease in the diameter of the snap ring. Therefore, even if the removal limiting structure of JP4645389B2 is used in the hydraulic accumulator, it is impossible to limit removal of the snap ring from the groove.

SUMMARY

The present disclosure is made in view of the above disadvantages, and it is an objective of the present disclosure to provide a hydraulic accumulator to be connected to an oil passage, which is configured to supply an oil pressure to a friction element of a transmission of a vehicle, while the hydraulic accumulator effectively limits removal of a snap ring from a groove formed at an inner peripheral wall of a tubular portion of a housing.

According to a first aspect of the present disclosure, there is provided a hydraulic accumulator to be connected to an oil passage, which is configured to supply an oil pressure to a friction element of a transmission of a vehicle, while the hydraulic accumulator is configured to accumulate the oil pressure supplied from the oil passage. The hydraulic accumulator includes a housing, a cover, a piston, a spring, a snap ring and a limiting portion.

The housing includes a tubular portion, which opens at one axial end side. The cover closes the tubular portion at the one axial end side. The piston is received in an inside of the tubular portion in a manner that enables movement of the piston in an axial direction. The piston forms an oil pressure chamber, which is configured to accumulate the oil pressure, at another axial end side, which is opposite from the one axial end side.

The spring is interposed between the cover and the piston to urge the piston toward the other axial end side. The snap ring is fitted into a circumferential groove, which is formed at an inner peripheral wall of the tubular portion. The cover is urged by the spring toward the one axial end side to contact the snap ring through an outer peripheral portion of the cover, so that removal of the cover from the tubular portion is limited. The limiting portion is fitted into a ring end gap of the snap ring and is configured to limit a decrease in a diameter of the snap ring.

According to the study conducted by the inventors of the present application, it is found that removal of the snap ring from the groove is most likely to occur through the following mechanism.

The snap ring is stamped from a metal sheet by a press machine. Therefore, one of two opposed surfaces of a portion of the snap ring, which is fitted into the groove, forms a sloped surface as a result of shear droop. Therefore, when the sloped surface contacts a corner of the groove through contacting of the cover to the snap ring, a load, which is exerted toward a radially inner side, is applied to the snap ring. Thereby, the sloped surface rides on the corner of the groove and is urged radially inwardly to cause radial contraction of the snap ring, which results in the decrease in the diameter of the snap ring. As a result, the snap ring is removed from the groove.

Furthermore, the hydraulic oil flows or is scattered at the region where the hydraulic accumulator is present, so that a friction coefficient between the sloped surface and the corner tends to be reduced. Because of this reason, the sloped surface can easily ride on the corner of the groove to cause the removal of the snap ring from the groove.

With respect to the above disadvantage, according to the first aspect of the present disclosure, the limiting portion is fitted into the ring end gap of the snap ring to limit the decrease in the diameter of the snap ring. Thus, it is possible to limit the riding of the sloped surface on the corner of the groove, and thereby it is possible to limit removal of the snap ring from the groove formed at the inner peripheral wall of the tubular portion.

According to a second aspect of the present disclosure, there is provided a manufacturing method of the hydraulic accumulator. In this manufacturing method, the limiting portion is formed by deforming a portion of the cover.

In this way, the removal of the snap ring from the groove formed at the inner peripheral wall of the tubular portion can be limited without increasing the number of the components.

BRIEF DESCRIPTION OF THE DRAWINGS

The present disclosure, together with additional objectives, features and advantages thereof, will be best understood from the following description, the appended claims and the accompanying drawings in which:

DETAILED DESCRIPTION

Hereinafter, various embodiments of the present disclosure will be described. Here, it should be noted that the following embodiments disclose specific examples, and the present disclosure is not necessarily limited to the following embodiments.

First Embodiment

A structure of a hydraulic accumulator 1 according to a first embodiment of the present disclosure will be described with reference to FIGS. 1 to 8.

Figure 1:
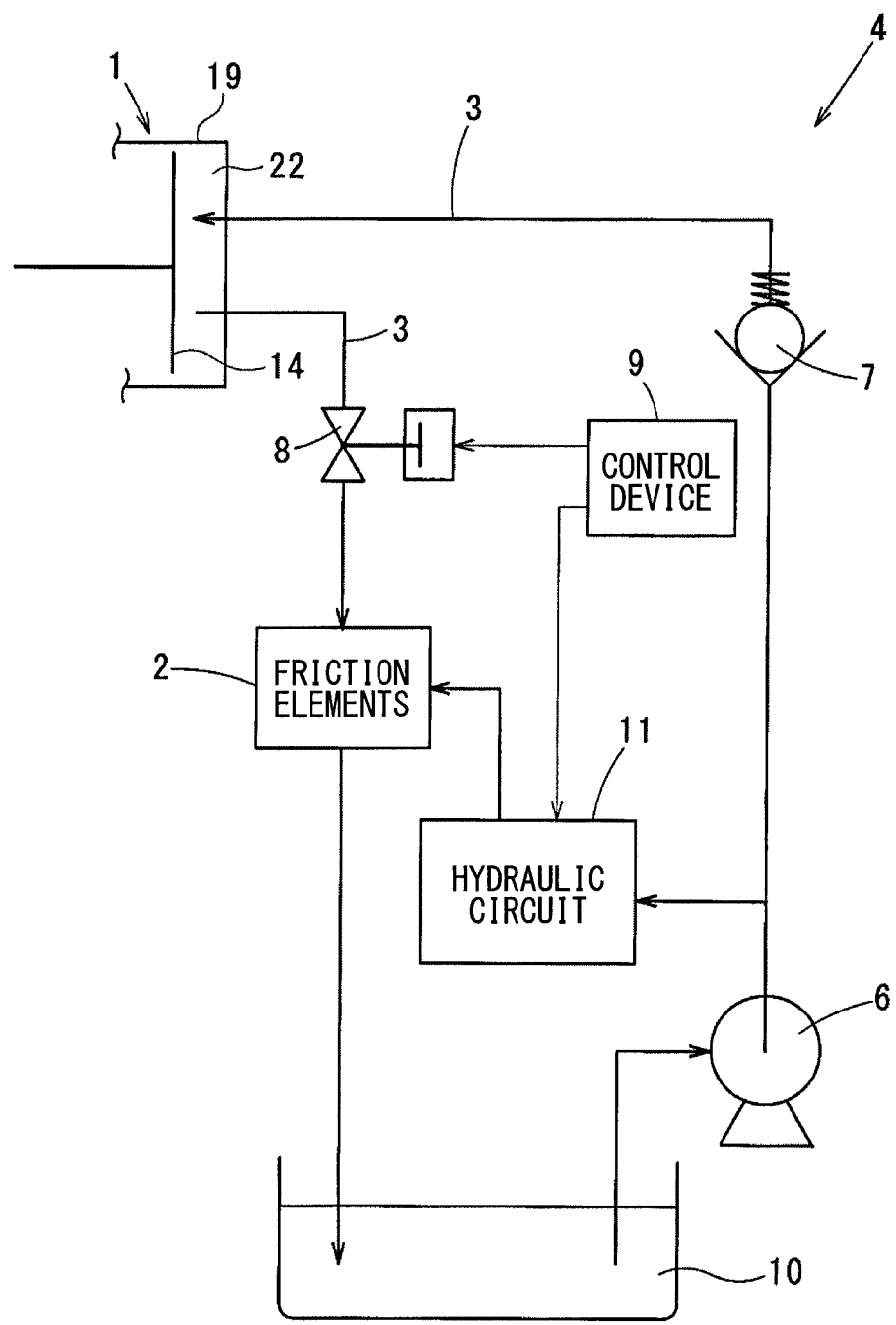
FIG. 1 is a schematic view showing an entire structure of an oil pressure supply system that includes a hydraulic accumulator according to a first embodiment.
Figure 2:
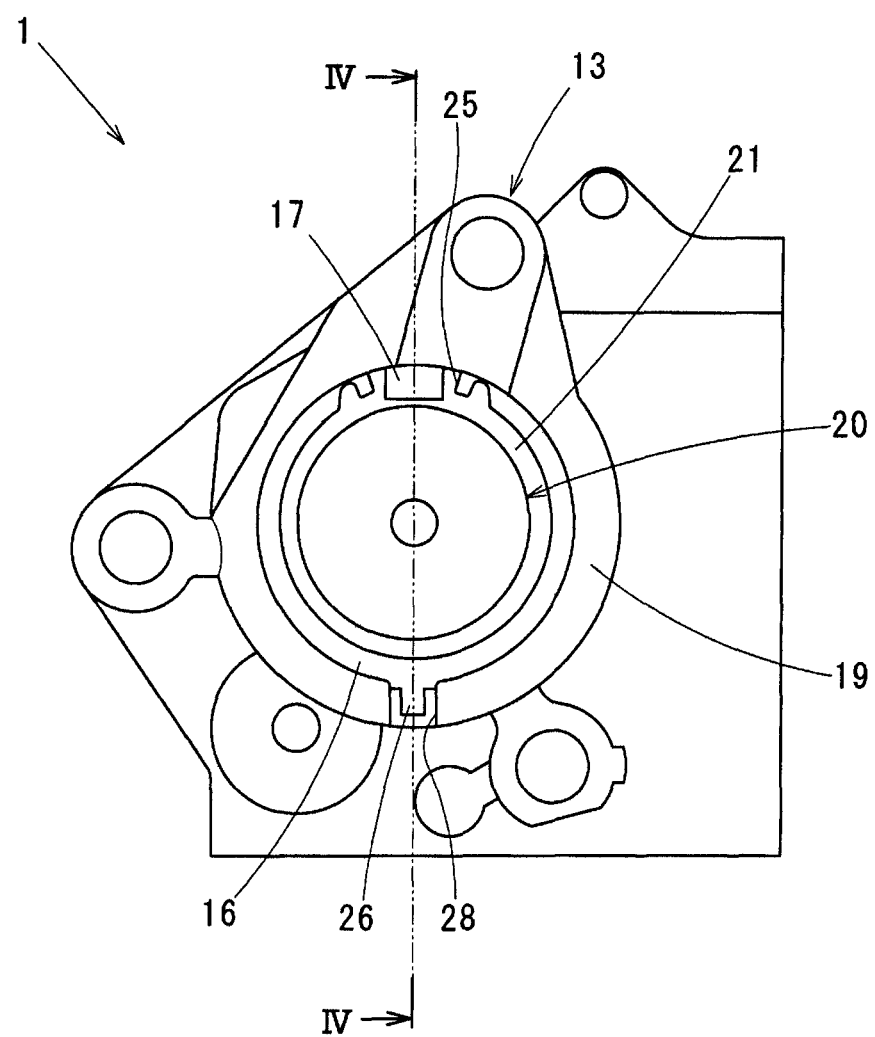
FIG. 2 is a front view of the hydraulic accumulator according to the first embodiment.
Figure 3:
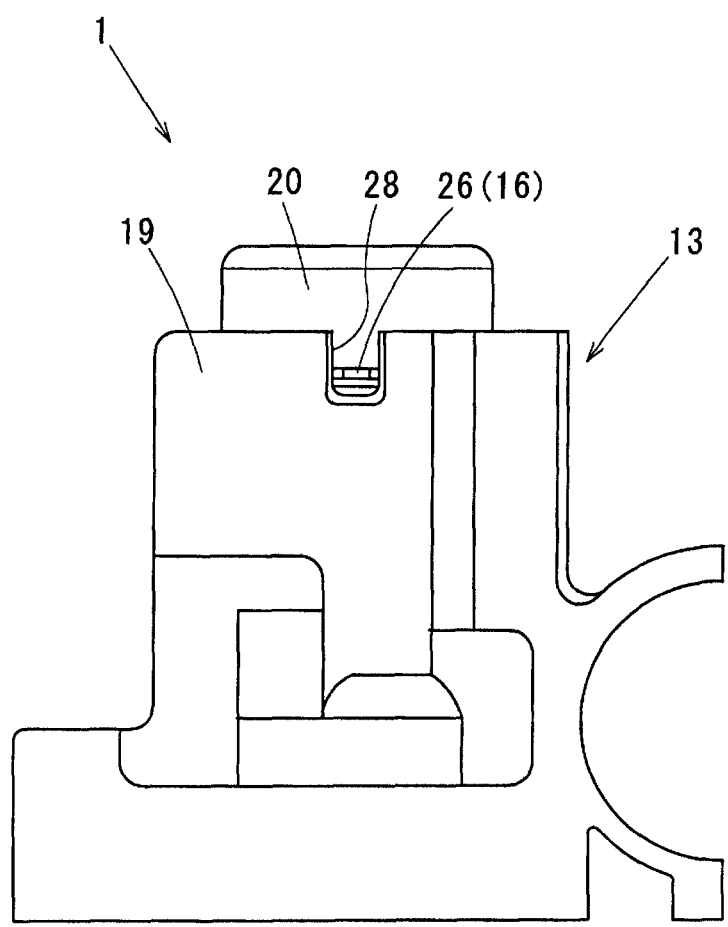
FIG. 3 is a side view of the hydraulic accumulator according to the first embodiment.

With reference to FIG. 1, the hydraulic accumulator 1 is connected to an oil passage 3, which is configured to supply an oil pressure to each corresponding one of a plurality of friction elements 2 of a transmission of a vehicle, while the hydraulic accumulator 1 is configured to accumulate the oil pressure supplied from the oil passage 3. In FIG. 1, the friction elements 2 are collectively indicated for the sake of simplicity. The hydraulic accumulator 1 constitutes a part of an oil pressure supply system 4 that supplies the oil pressure to the friction elements 2. The hydraulic accumulator 1 is used as an oil pressure source. Specifically, the hydraulic accumulator 1 accumulates the oil pressure during the time of operating an internal combustion engine of the vehicle. Then, the hydraulic accumulator 1 serves as the oil pressure source to supply the oil pressure to each corresponding one of the friction elements 2 at the time of, for example, immediately after termination of an idling stop operation of a start-stop system (i.e., at the time of restarting the internal combustion engine after stopping the internal combustion engine through the idling stop operation).

The oil pressure supply system 4 further includes an oil pressure pump 6, a check valve 7, an electromagnetic opening/closing valve 8 and a control device 9 besides the hydraulic accumulator 1. The oil pressure pump 6 is driven by the internal combustion engine, so that the oil pressure pump 6 suctions hydraulic oil from an oil pan 10 and then pressurizes and discharges the suctioned hydraulic oil. Thereby, when the internal combustion engine is stopped, the oil pressure pump 6 is stopped. The check valve 7 is installed in a section of the oil passage 3, which extends from the oil pressure pump 6 to the hydraulic accumulator 1, such that the check valve 7 opens to enable flow of the hydraulic oil from the oil pressure pump 6 to the hydraulic accumulator 1 when the oil pressure in this section of the oil passage 3 becomes equal to or higher than a predetermined threshold value. The opening/closing valve 8 is installed in another section of the oil passage 3, which extends from the hydraulic accumulator 1 to the friction elements 2, such that the opening/closing valve 8 opens based on a command outputted from the control device 9.

The control device 9 mainly controls the supply of the oil pressure to the friction elements 2 during the time of operating the internal combustion engine. Here, the oil pressure is supplied to each corresponding friction element 2 during the time of operating the internal combustion engine through an ordinary hydraulic circuit (oil circuit) 11 that includes various oil pressure control valves controlled by the control device 9.

With this construction, in the oil pressure supply system 4, the oil pressure pump 6 is operated during the time of operating the internal combustion engine, and thereby the check valve 7 is opened to accumulate the oil pressure in the hydraulic accumulator 1. Furthermore, when the operation of the internal combustion engine is stopped by, for example, the idling stop operation of the start-stop system, the operation of the oil pressure pump 6 is stopped, and thereby the check valve 7 is closed. Thus, the hydraulic accumulator 1 maintains the current state where the oil pressure is stored in the hydraulic accumulator 1. Thereafter, at the time of restarting the operation of the internal combustion engine by terminating the idling stop operation, the opening/closing valve 8 is opened based on a command outputted from the control device 9. Thereby, the oil pressure is supplied from the hydraulic accumulator 1 to each corresponding one of the friction elements 2. Therefore, at the time of restarting the operation of the internal combustion engine, the oil pressure can be supplied to each corresponding one of the friction elements 2 before the time of starting pressure boost by the oil pressure pump 6.

Hereinafter, the hydraulic accumulator 1 will be described in detail with reference to FIGS. 2 to 8.

The hydraulic accumulator 1 includes a housing 13, a cover 20, a piston 14, a spring 15, a snap ring 16 and a limiting portion 17.

Figure 4:
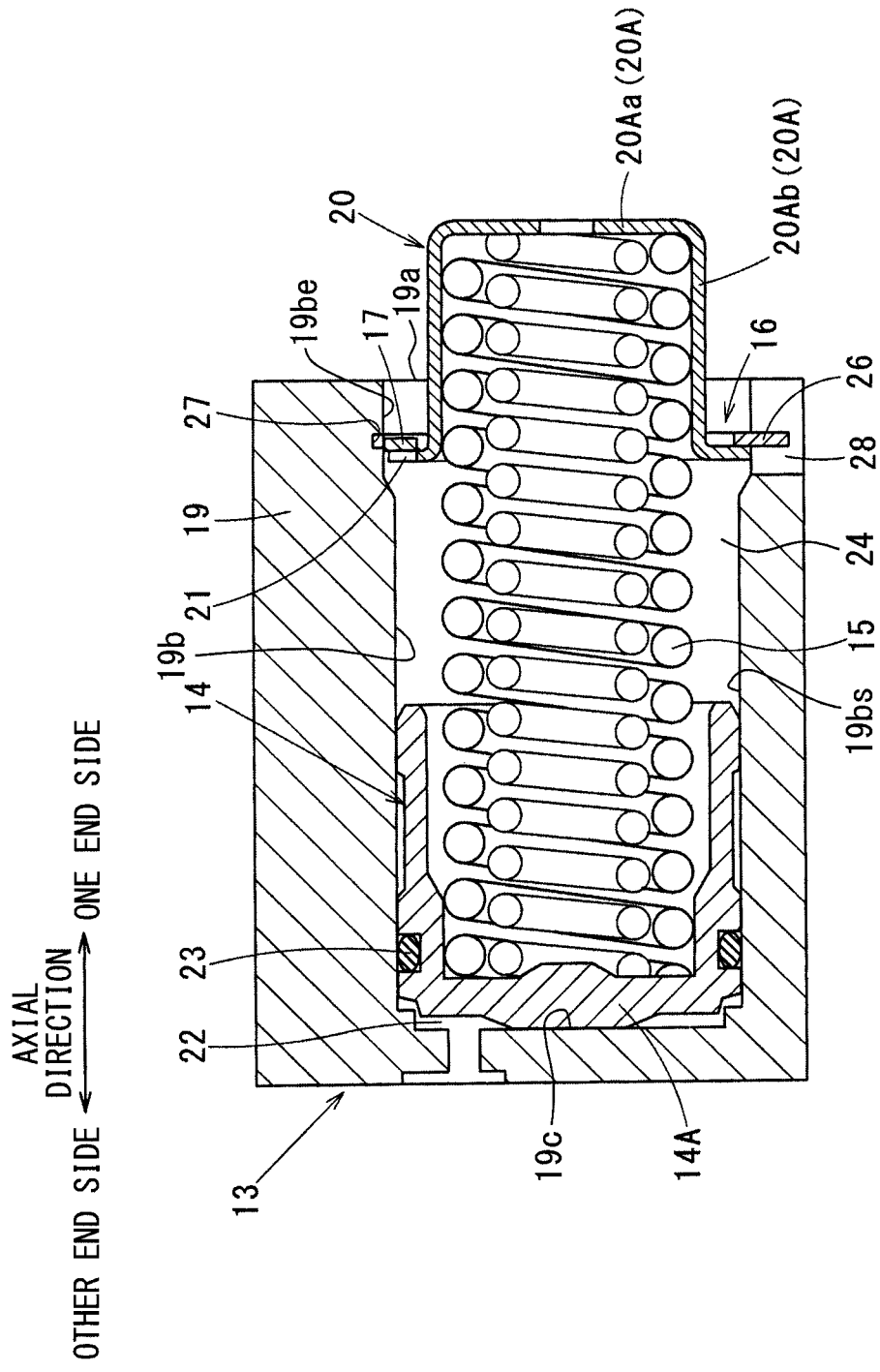
FIG. 4 is a cross-sectional view taken along line IV-IV of FIG. 2 according to the first embodiment.
Figure 5:
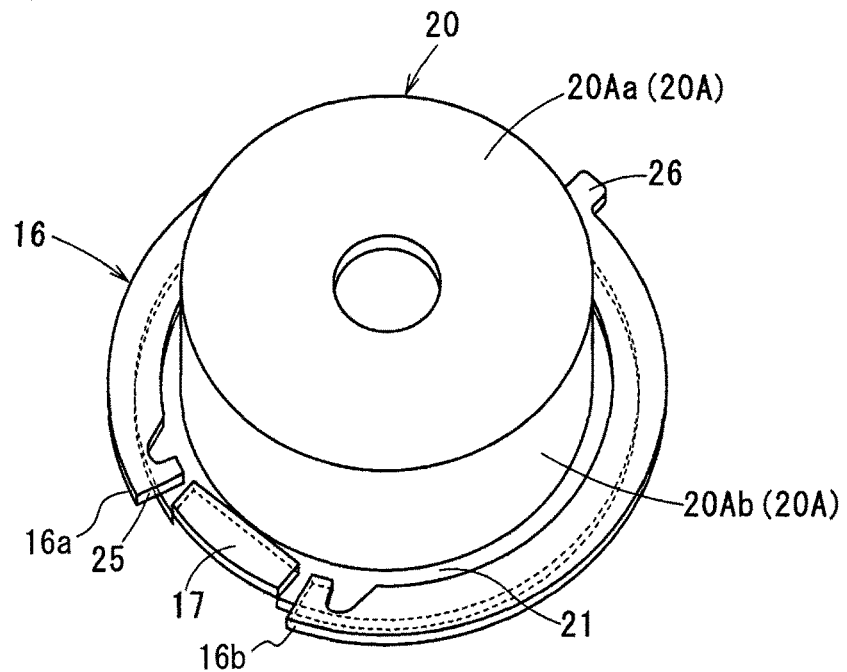
FIG. 5 is a perspective view of a cover and a snap ring according to the first embodiment.
Figure 6:
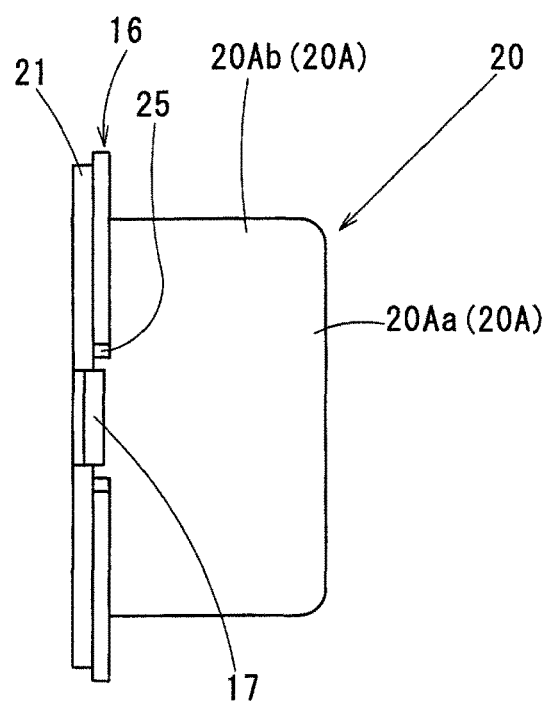
FIG. 6 is a side view of the cover and the snap ring according to the first embodiment.

The housing 13 includes a tubular portion 19 that opens at one axial end side to form an open end part 19a of the tubular portion 19. With reference to FIG. 4, the one axial end side (also simply referred to as one end side) is a side where the open end part 19a of the tubular portion 19 is placed in the axial direction, and the other axial end side (also simply referred to as the other end side) is a side which is opposite from the one axial end side in the axial direction. The tubular portion 19 is an integral part of the housing 13 that is formed by, for example, metal die casting.

The cover 20 closes the one axial end side (i.e., the open end part 19a) of the tubular portion 19. The cover 20 is shaped into a cup form and has a flange 21 at an open end part of the cover 20. A bottom 20Aa of a main body 20A of the cover 20 forms a spring seat that supports one axial end of the spring 15.

The piston 14 is shaped into a cup form that has an outer diameter, which is substantially equal to an inner diameter of a slidably contacting section 19bs of an inner peripheral wall 19b of the tubular portion 19, and the piston 14 is configured to slide along the slidably contacting section 19bs in the axial direction. The piston 14 is received in the tubular portion 19 such that a bottom 14A of the piston 14 is placed at the other axial end side, and the piston 14 is movable in the axial direction along the inner peripheral wall 19b (more specifically the slidably contacting section 19bs) of the tubular portion 19. An end region of the inside of the tubular portion 19, which is on the other axial end side of the bottom 14A and is defined between the bottom 14A of the piston 14 and a bottom 19c of the tubular portion 19 in the axial direction, forms an oil pressure chamber 22. The oil pressure chamber 22 is communicated with the oil passage 3 and is configured to accumulate the oil pressure supplied from the oil passage 3 (see FIG. 1). The bottom 14A of the piston 14 forms a spring seat that supports the other axial end of the spring 15. Thereby, at the inside of the tubular portion 19, a region between the bottom 14A and the cover 20 serves as a spring chamber 24, in which the spring 15 is received. An O-ring 23 is installed in a circumferential groove formed at the outer peripheral wall of the piston 14 to limit leakage of the hydraulic oil from the oil pressure chamber 22.

The spring 15 is interposed between the cover 20 and the piston 14 in the spring chamber 24 such that the spring 15 urges the piston 14 toward the other axial end side and also urges the cover 20 toward the one axial end side.

The snap ring 16 has a ring end gap 25 and a projection 26. The ring end gap 25 is a gap formed between two opposed circumferential ends 16a, 16b of the snap ring 16 (see FIG. 5). The projection 26 radially outwardly projects from the rest of the snap ring 16. The snap ring 16 is fitted into a circumferential groove 27, which is formed at an enlarged diameter section 19be of the inner peripheral wall 19b of the tubular portion 19 and extends in the circumferential direction. The enlarged diameter section 19be has an inner diameter that is larger than an inner diameter of the slidably contacting section 19bs. When the cover 20 is urged toward the one axial end side by the spring 15, the flange 21 of the cover 20 is urged against the snap ring 16 in the axial direction. Thereby, removal (detachment) of the cover 20 from the tubular portion 19 is limited by the snap ring 16. In the snap ring 16, the projection 26 is placed at a position where the projection 26 is displaced by 180 degrees from the ring end gap 25 and is thereby diametrically opposed to the ring end gap 25. The projection 26 is fitted into a recess 28, which is formed at the one axial end side of the tubular portion 19, and thereby the projection 26 limits rotation of the snap ring 16.

With the above construction, in the hydraulic accumulator 1, during the time of operating the internal combustion engine, the check valve 7 opens, and thereby the hydraulic oil flows into the oil pressure chamber 22. The hydraulic oil, which flows into the oil pressure chamber 22, drives the piston 14 toward the one axial end side against the urging force of the spring 15. The oil pressure chamber 22 is expanded until the piston 14 contacts the cover 20. Thereafter, when the operation of the internal combustion engine stops due to, for example, the idling stop operation, the check valve 7 is closed. Thus, the oil pressure chamber 22 maintains the expanded state and holds the oil pressure.

Then, when the operation of the internal combustion engine is restarted due to, for example, the termination of the idling stop operation, the opening/closing valve 8 opens based on the command outputted from the control device 9. In this way, the outflow of the hydraulic oil from the oil pressure chamber 22 starts, and thereby the oil pressure is supplied from the oil pressure chamber 22 to each corresponding one of the friction elements 2. At this time, the piston 14 is moved toward the other axial end side by the urging force of the spring 15. Thereby, the size of the oil pressure chamber 22 is progressively reduced until the piston 14 contacts the bottom 19c of the tubular portion 19.

The limiting portion 17 is fitted into the ring end gap 25 of the snap ring 16 to limit a decrease in a diameter of the snap ring 16, which is caused by radial contraction of the snap ring 16. Furthermore, the limiting portion 17 is a portion of the flange 21 that is raised toward the one axial end side and is continuous with the rest of the flange 21.

The limiting portion 17 is formed by deforming a portion of the cover 20. More specifically, the portion of the flange 21 is embossed, i.e., is raised by an amount that corresponds to one half of the plate thickness of the flange 21 toward the one axial end side by press working.

Advantages of First Embodiment

The hydraulic accumulator 1 of the first embodiment includes the limiting portion 17 that is fitted into the ring end gap 25 of the snap ring 16 to limit the decrease in the diameter of the snap ring 16, which is caused by the radial contraction of the snap ring 16.

Figure 7:
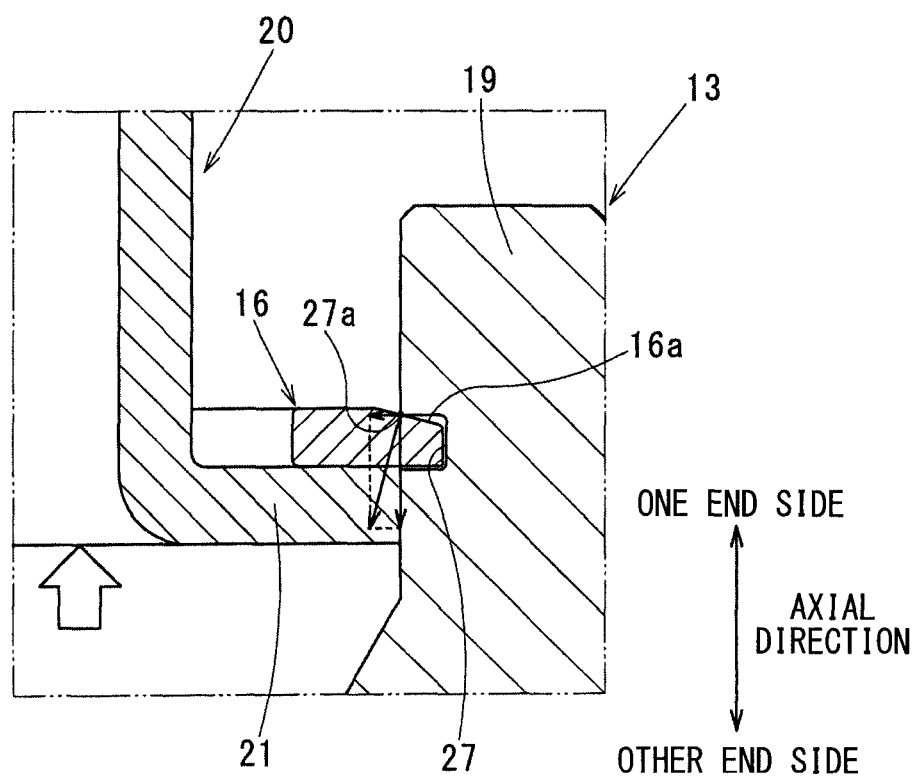
FIG. 7 is a descriptive view for describing a mechanism of removal of the snap ring from a groove according to the first embodiment.
Figure 8:
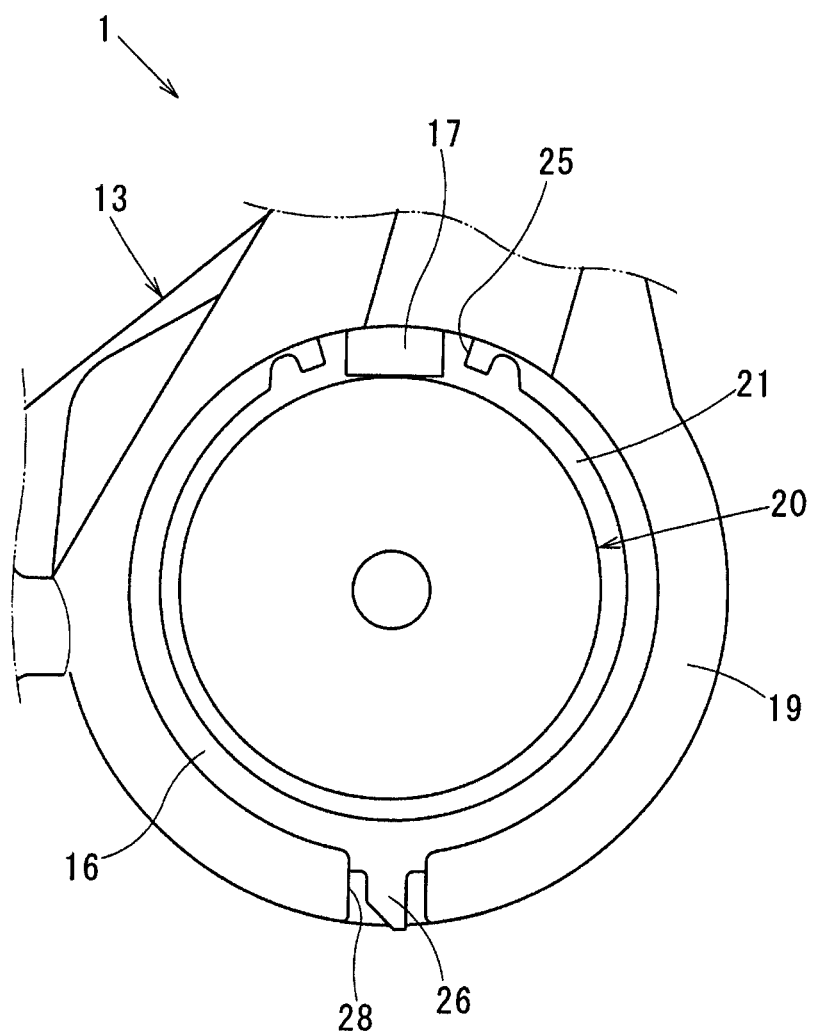
FIG. 8 is a descriptive view for describing a structure for identifying a front and a back of the snap ring in a case where a limiting portion is not formed.

Here, according to the study conducted by the inventors of the present application, it is found that removal of the snap ring 16 from the groove 27 is most likely to occur through the following mechanism (see FIG. 7).

Specifically, at the time of manufacturing the snap ring 16, the snap ring 16 is stamped from a metal sheet by a press machine. Therefore, one of two opposed surfaces (an upper surface and a lower surface in FIG. 7) of a portion of the snap ring 16, which is fitted into the groove 27, forms a sloped surface 16a as a result of shear droop. Thus, in a case where the sloped surface 16a is placed on the one axial end side (also referred to as the one end side), the sloped surface 16a is urged against a corner 27a of the groove 27 by an urging force applied from the cover 20 that is in turn urged by the spring 15, and thereby a load, which is directed toward the radially inner side, is applied to the snap ring 16. Thereby, the sloped surface 16a rides on the corner 27a and is urged radially inwardly to cause radial contraction of the snap ring 16, which results in the decrease in the diameter of the snap ring 16. As a result, the snap ring 16 is removed from the groove 27.

Furthermore, the hydraulic oil flows or is scattered at the region where the hydraulic accumulator 1 is present, so that a friction coefficient between the sloped surface 16a and the corner 27a tends to be reduced. Because of this reason, the sloped surface 16a can easily ride on the corner 27a to cause the removal of the snap ring 16 from the groove 27.

Therefore, in a case where the limiting portion 17 is not formed, an identification feature needs to be formed on the snap ring 16 to avoid erroneous placement of the sloped surface 16a on the one axial end side. For example, it may be necessary to obliquely cut a part of the projection 26 to enable identification of a front side and a back side of the snap ring 16 (see FIG. 8).

With respect to the above disadvantage, according to the present embodiment, the limiting portion 17 is fitted into the ring end gap 25 of the snap ring 16 to limit the decrease in the diameter of the snap ring 16, which is caused by the radial contraction of the snap ring 16. Thus, it is possible to limit the riding of the sloped surface 16a on the corner 27a, and thereby it is possible to limit the removal of the snap ring 16 from the groove 27.

Alternatively, it is conceivable to limit (or reduce) the amount of the slope of the snap ring 16 caused by the shear droop and thereby to limit the removal of the snap ring 16 from the groove 27. In order to limit (or reduce) the amount of the slope of the snap ring 16 caused by the shear droop, it is necessary to reduce a size of a clearance between an outer peripheral portion of a punch and an inner peripheral portion of a die used in the press working. However, the reduction in the size of the clearance shortens the life expectancy of the die. Thus, in view of the life expectancy of the die, it is desirable to limit the decrease in the diameter of the snap ring 16 with the limiting portion 17 rather than limiting (or reducing) the amount of the slope of the snap ring 16.

Furthermore, the limiting portion 17 is an integral part of the flange 21, and the limiting portion 17 is continuous with the rest of the flange 21 in the circumferential direction while the limiting portion 17 is raised toward the one axial end side and is fitted into the ring end gap 25.

In this way, it is possible to form the limiting portion 17 while maintaining the required strength.

Furthermore, the limiting portion 17 is formed by raising the portion of the flange 21 toward the one axial end side by the press working.

In this way, at the time of forming the cover 20 through the press working, the limiting portion 17 can be simultaneously formed. Thereby, the limiting portion 17 can be formed with the minimum costs.

Furthermore, in the hydraulic accumulator 1, the portion of the cover 20 is deformed to form the limiting portion 17.

In this way, the removal of the snap ring 16 from the groove 27 can be limited without increasing the number of the components.

Second Embodiment

A hydraulic accumulator 1 according to a second embodiment will be described mainly with respect to differences relative to the hydraulic accumulator 1 of the first embodiment.

Figure 9:
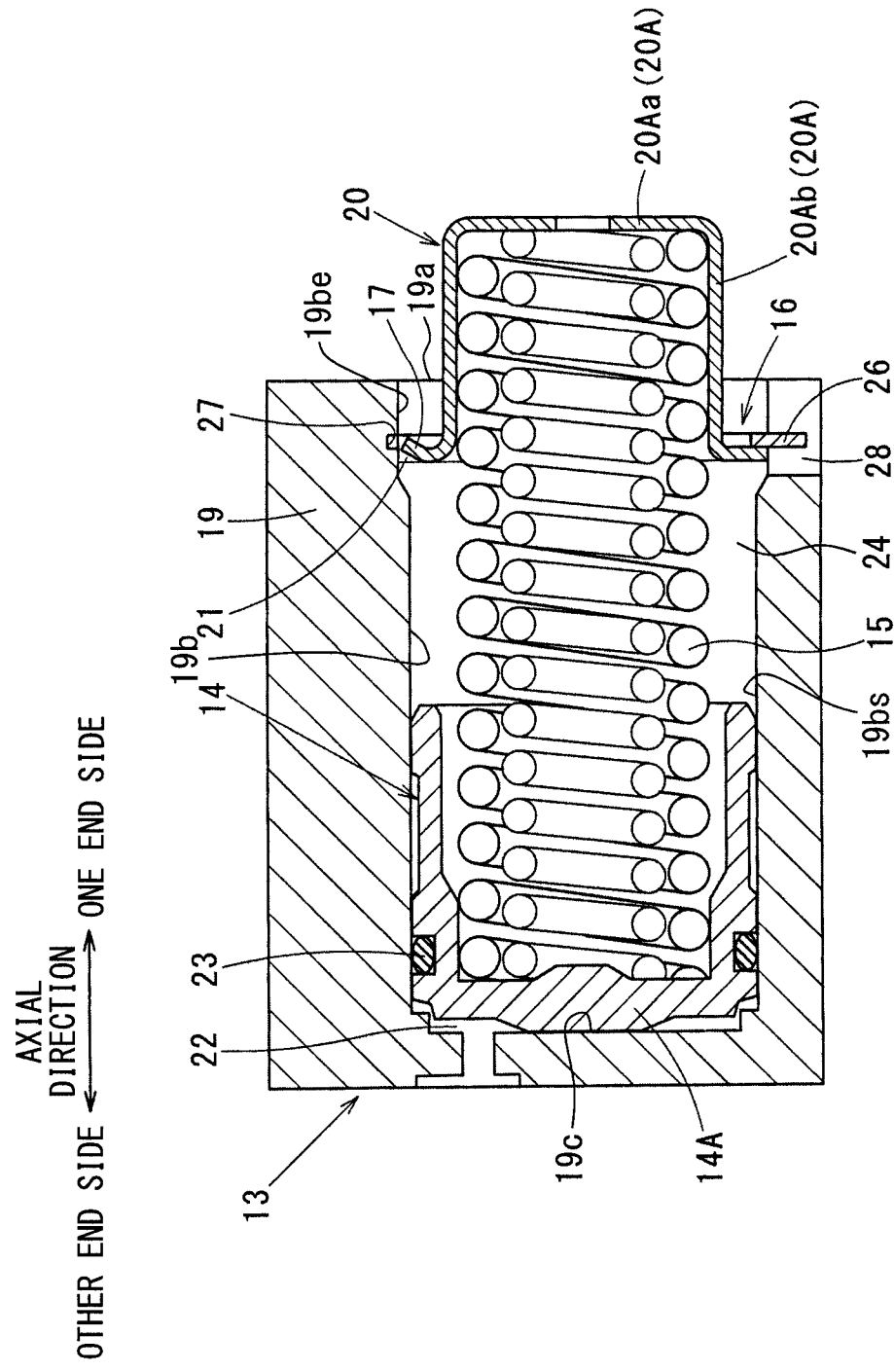
FIG. 9 is a cross-sectional view of a hydraulic accumulator according to a second embodiment.
Figure 10:
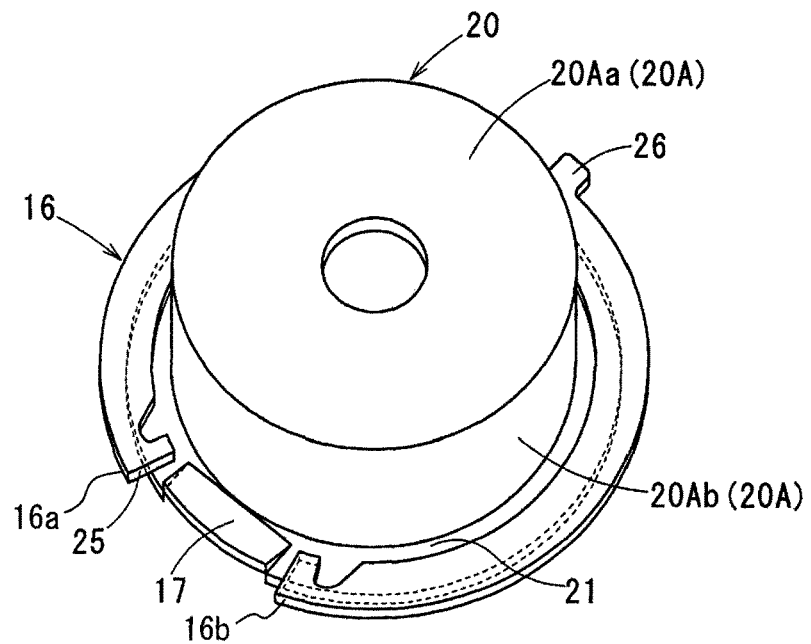
FIG. 10 is a perspective view of a cover and a snap ring according to the second embodiment.
Figure 11:
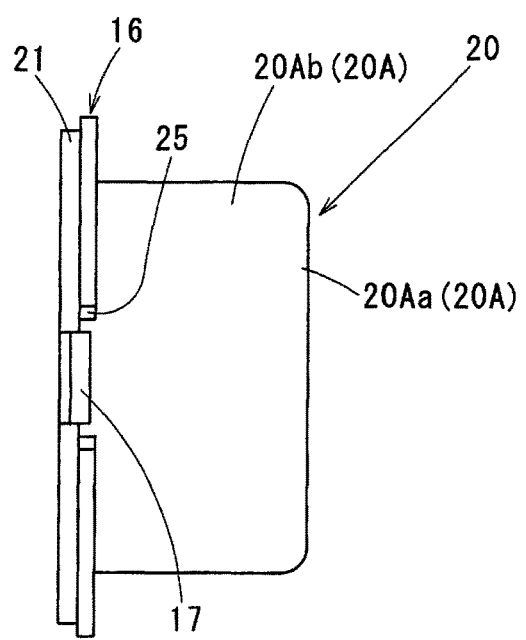
FIG. 11 is a side view of the cover and the snap ring according to the second embodiment.
Figure 12:
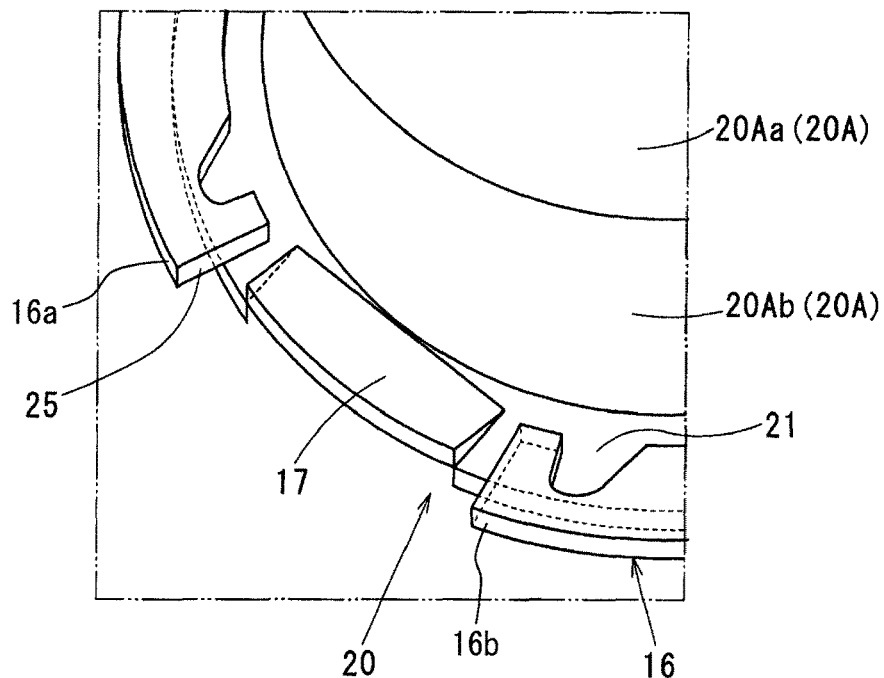
FIG. 12 is an enlarged perspective view of a limiting portion according to the second embodiment.
Figure 13:
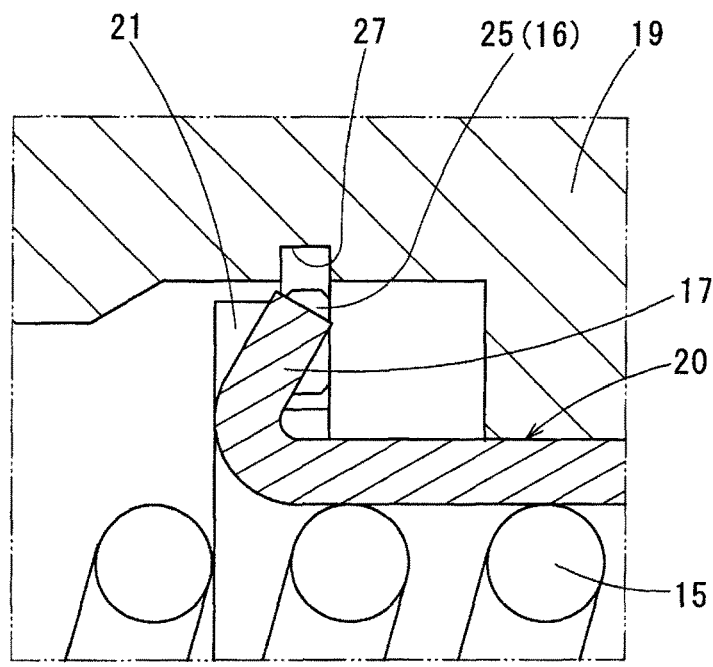
FIG. 13 is an enlarged cross-sectional view of the limiting portion according to the second embodiment.
Figure 14:
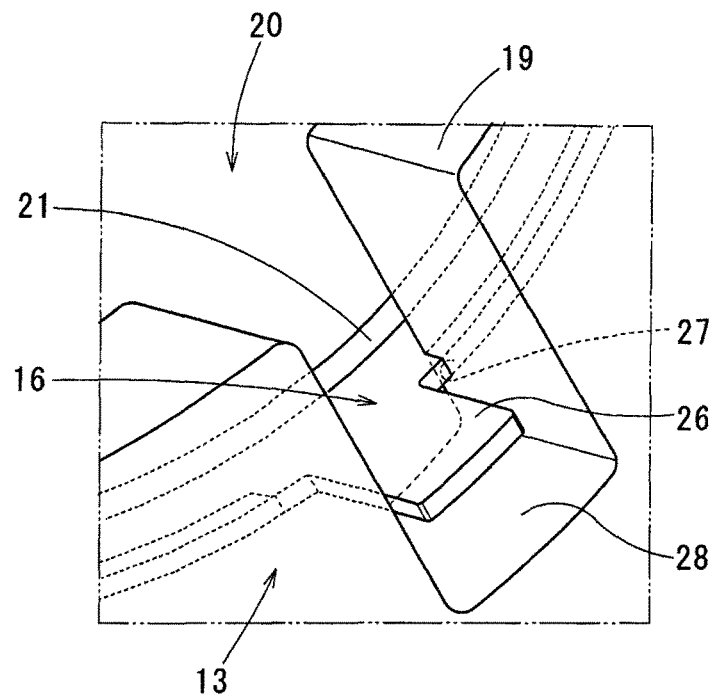
FIG. 14 is an enlarged perspective view of a projection according to the second embodiment.
Figure 15:
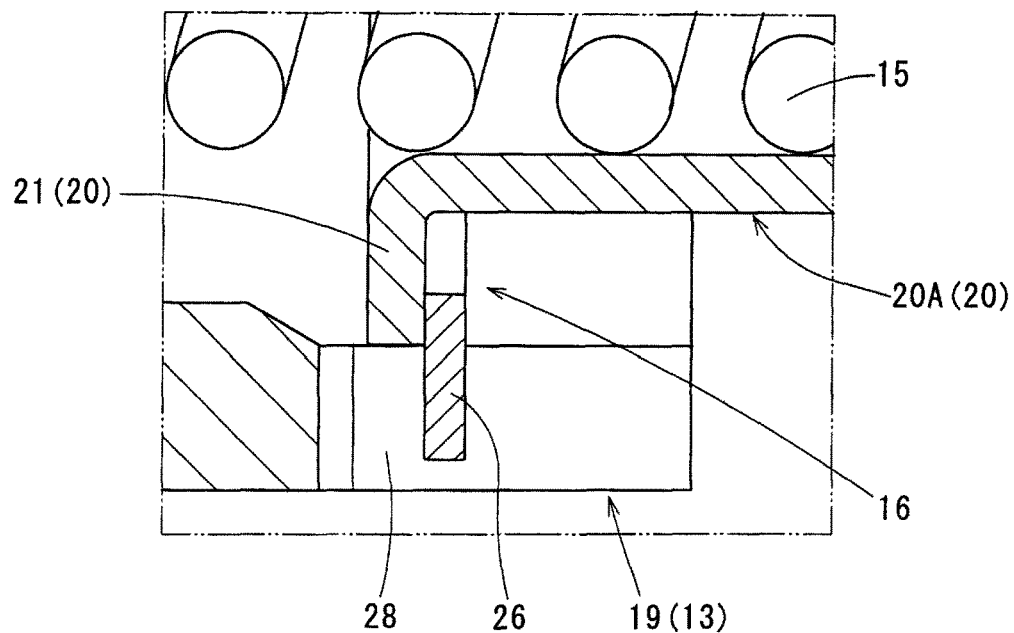
FIG. 15 is another enlarged cross-sectional view of the projection according to the second embodiment.

In the hydraulic accumulator 1 of the second embodiment, as shown in FIGS. 9 to 11, the limiting portion 17 is an integral part of the flange 21, and the limiting portion 17 is discontinuous to the rest of the flange 21 in the circumferential direction while the limiting portion 17 is raised toward the one axial end side. More specifically, the limiting portion 17 is formed as follows. First of all, a cut is made at two locations of the flange 21, which are circumferentially spaced from each other, and a portion of the flange 21, which is located between these two locations, is bent toward the one axial end side to form the limiting portion 17.

Figure 16:
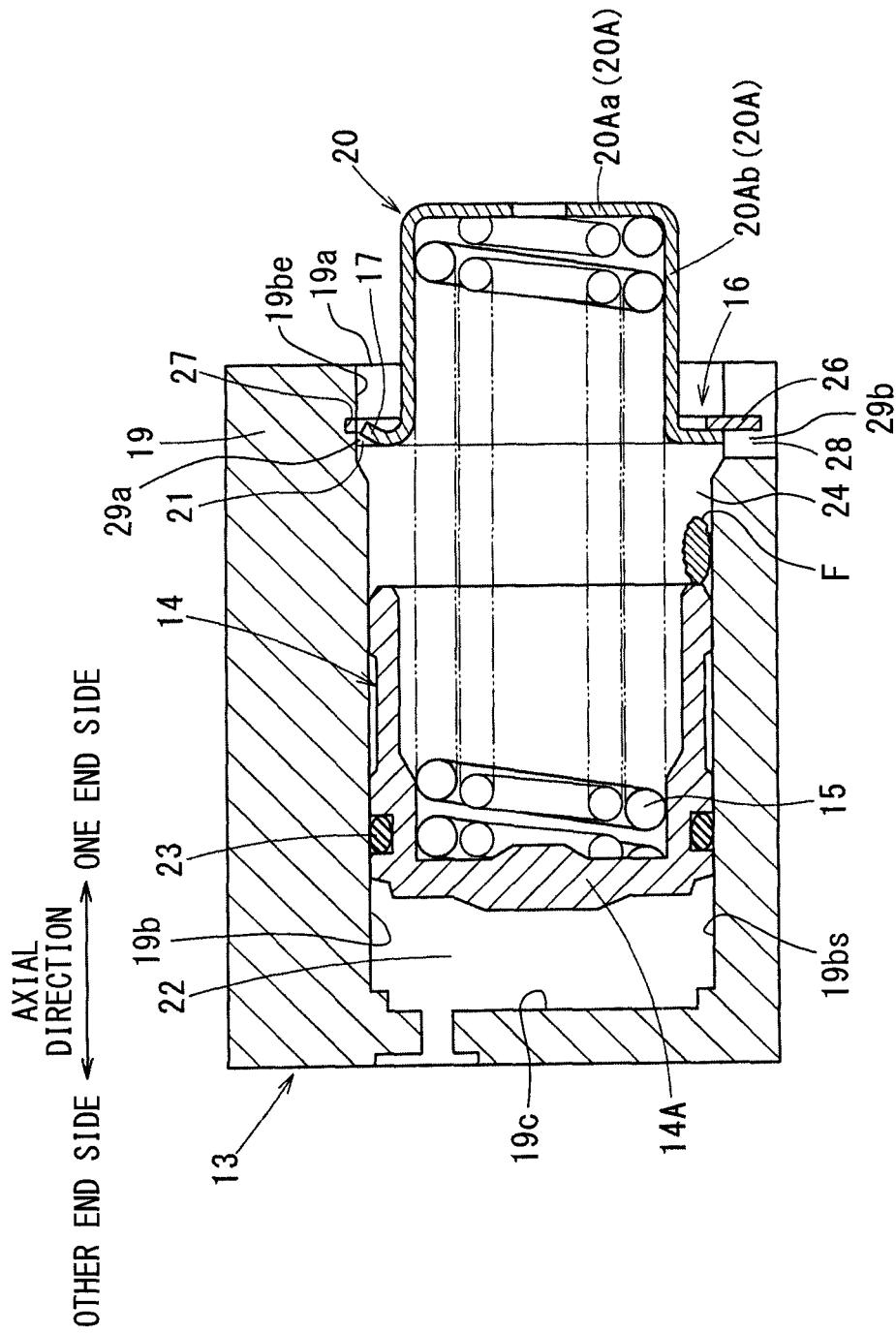
FIG. 16 is a cross-sectional view showing an intermediate stroke state where a piston is not in contact with a cover according to the second embodiment.
Figure 17:
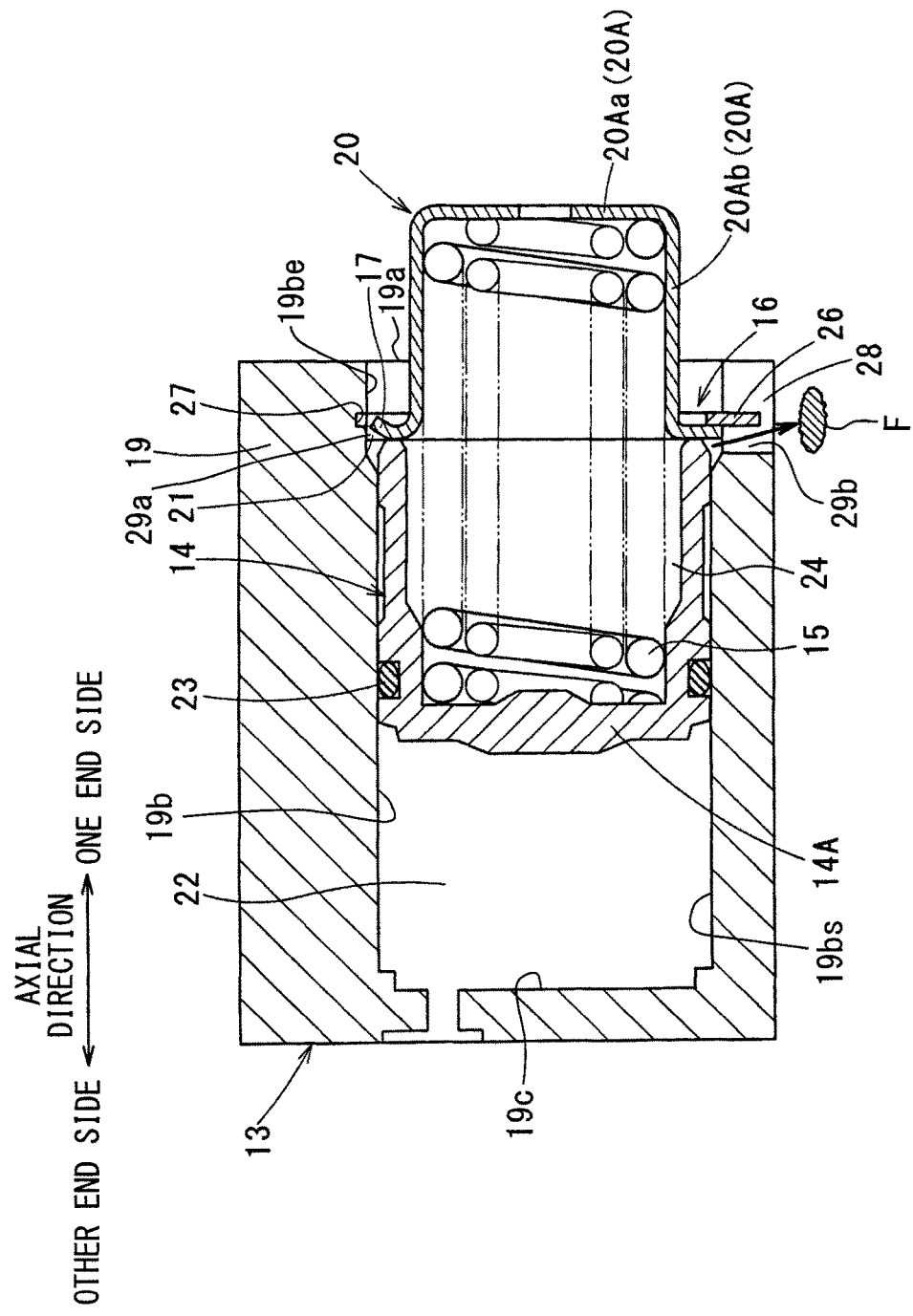
FIG. 17 is a cross-sectional view showing a full stroke state where the piston is in contact with the cover according to the second embodiment.
Figure 18:
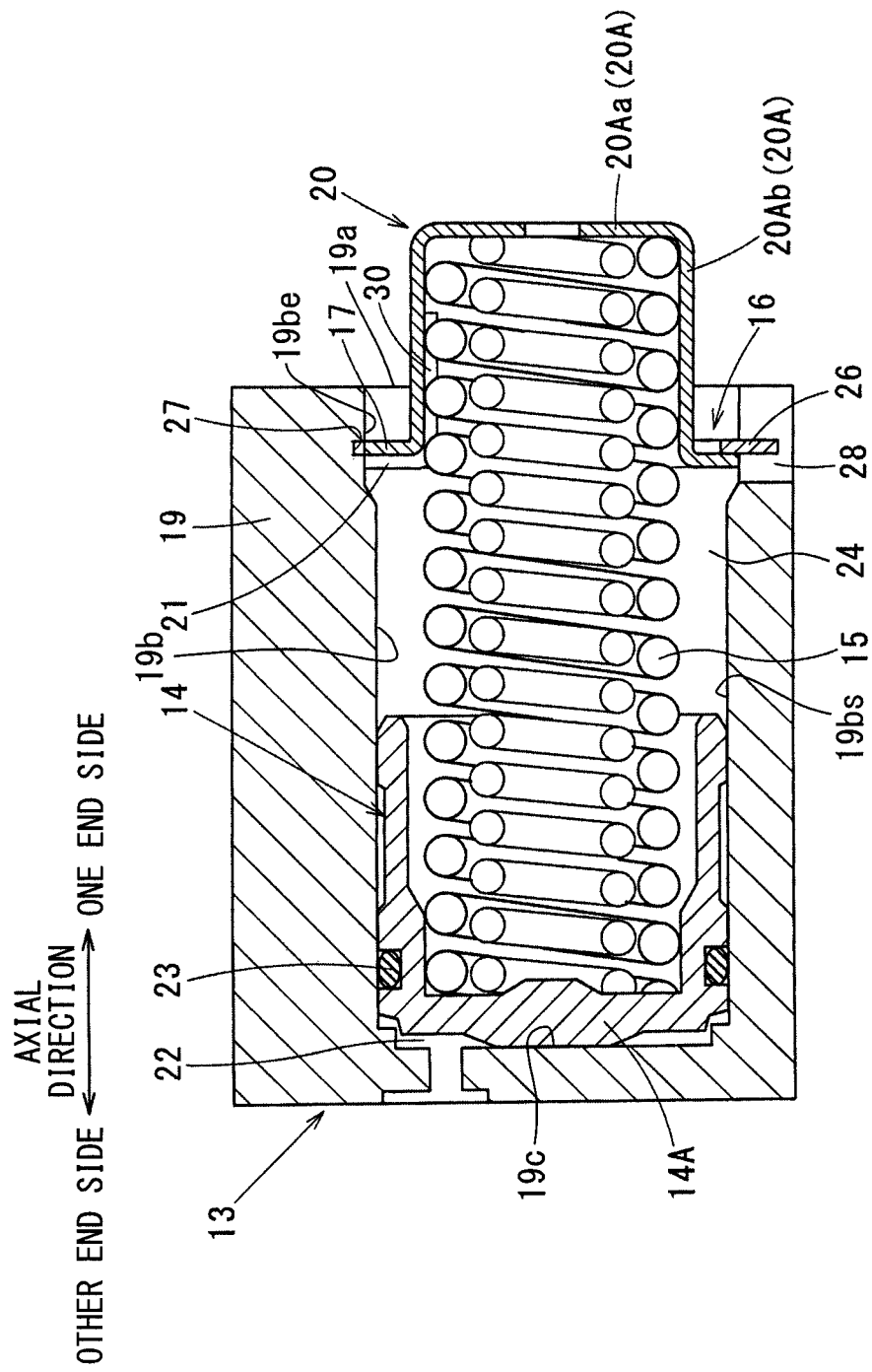
FIG. 18 is a cross-sectional view of a hydraulic accumulator according to a third embodiment.
Figure 19:
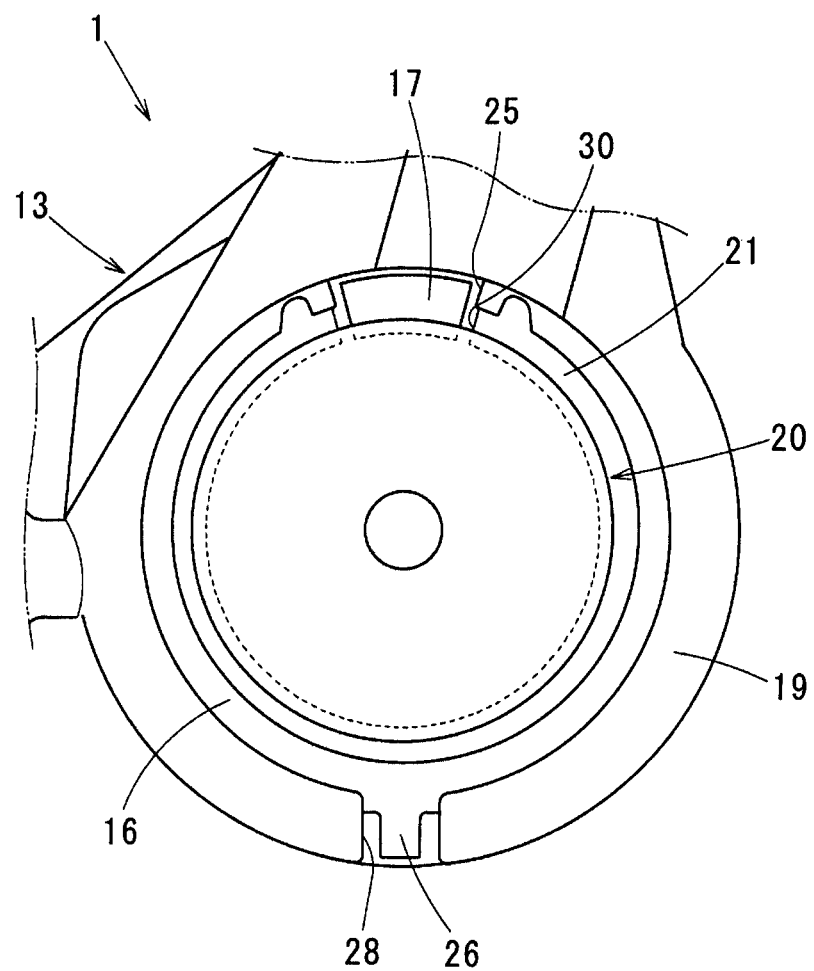
FIG. 19 is a front view of the hydraulic accumulator according to the third embodiment.
Figure 20:
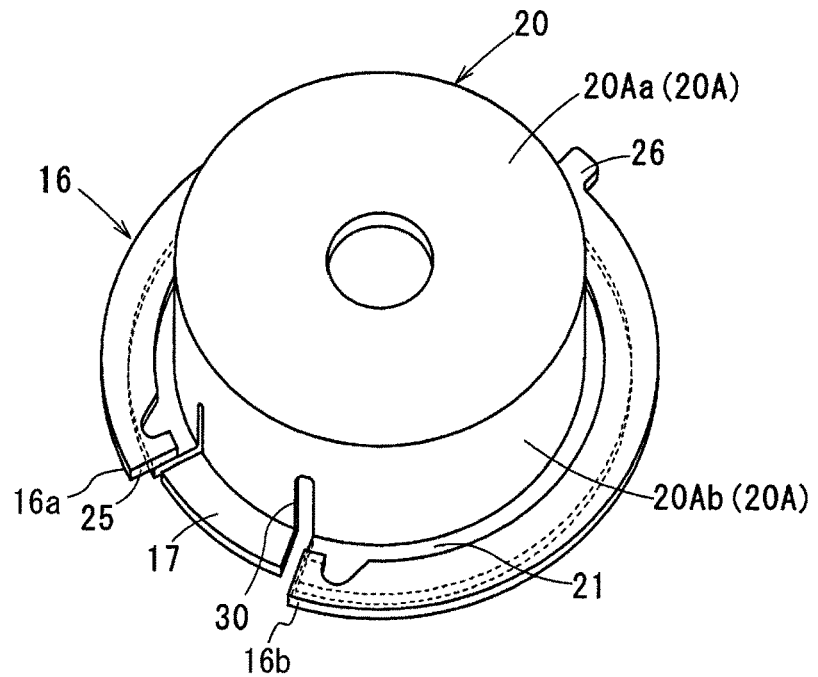
FIG. 20 is a perspective view of a cover and a snap ring according to the third embodiment.
Figure 21:
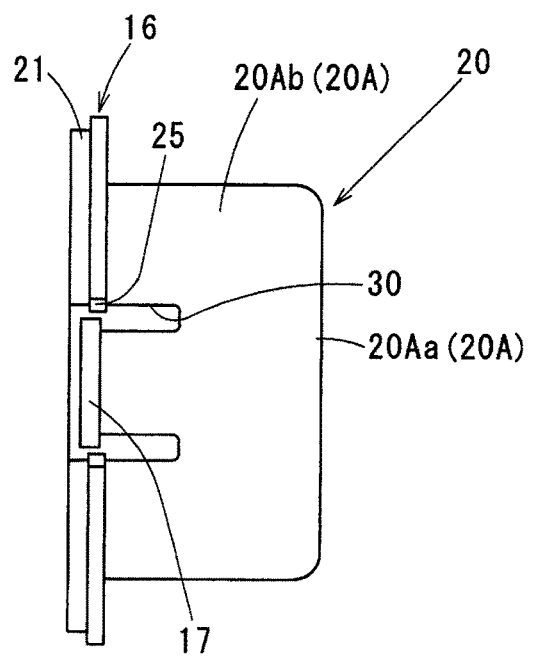
FIG. 21 is a side view of the cover and the snap ring according to the third embodiment.
Figure 22:
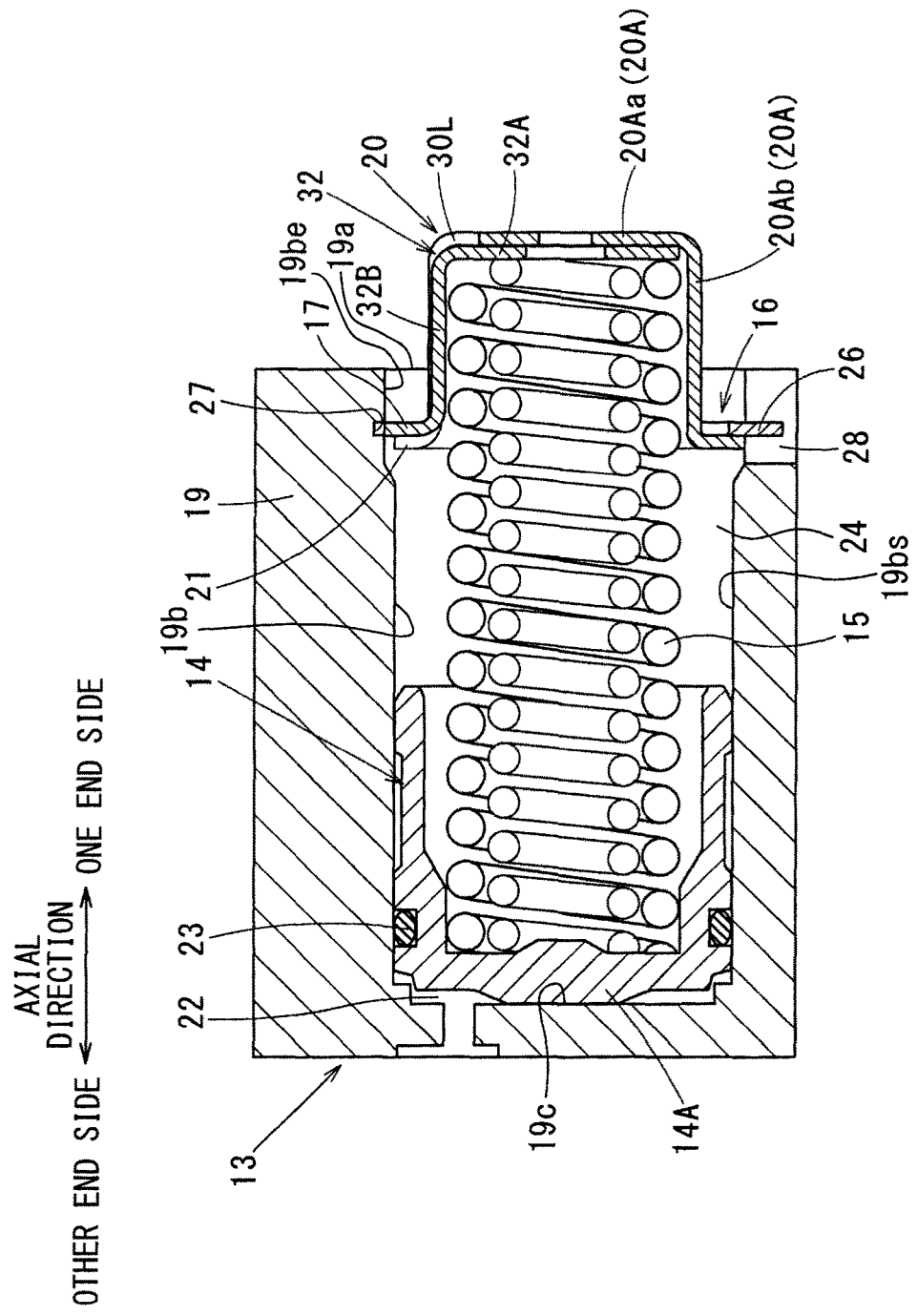
FIG. 22 is a cross-sectional view of a hydraulic accumulator according to a fourth embodiment.
Figure 23:
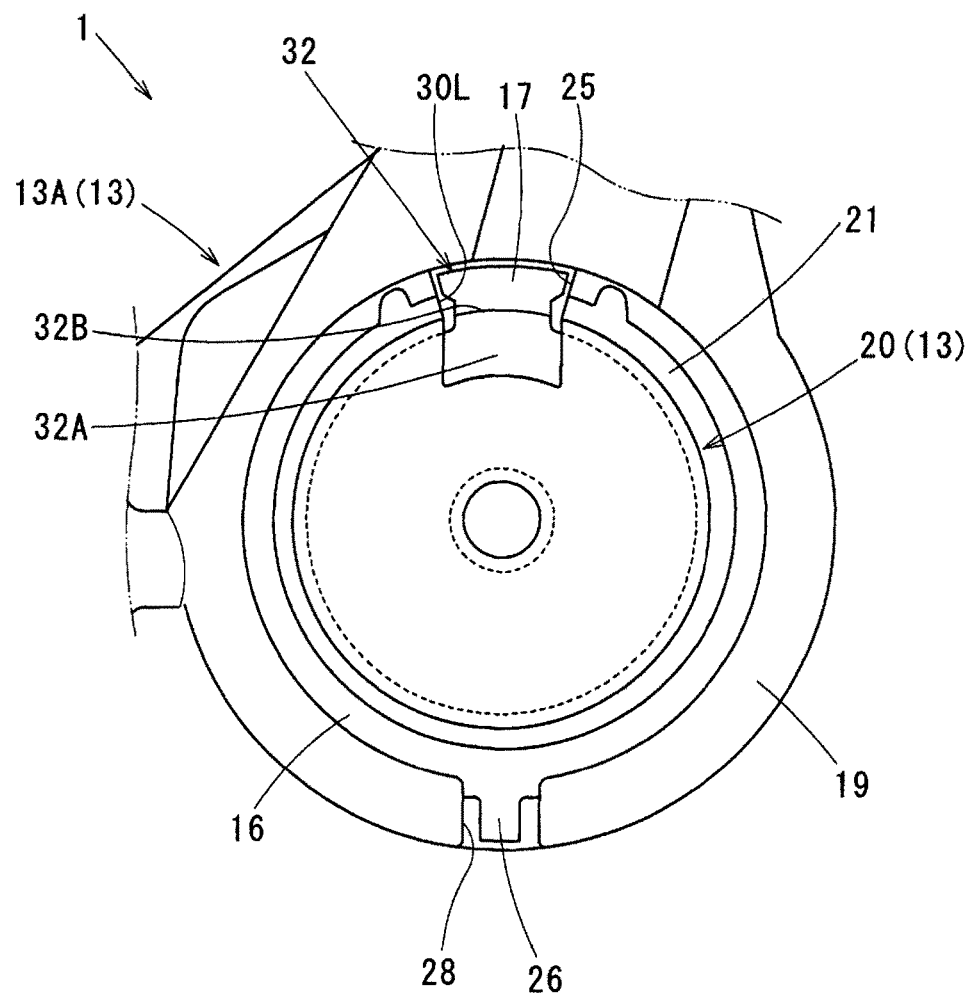
FIG. 23 is a front view of the hydraulic accumulator according to the fourth embodiment.
Figure 24:
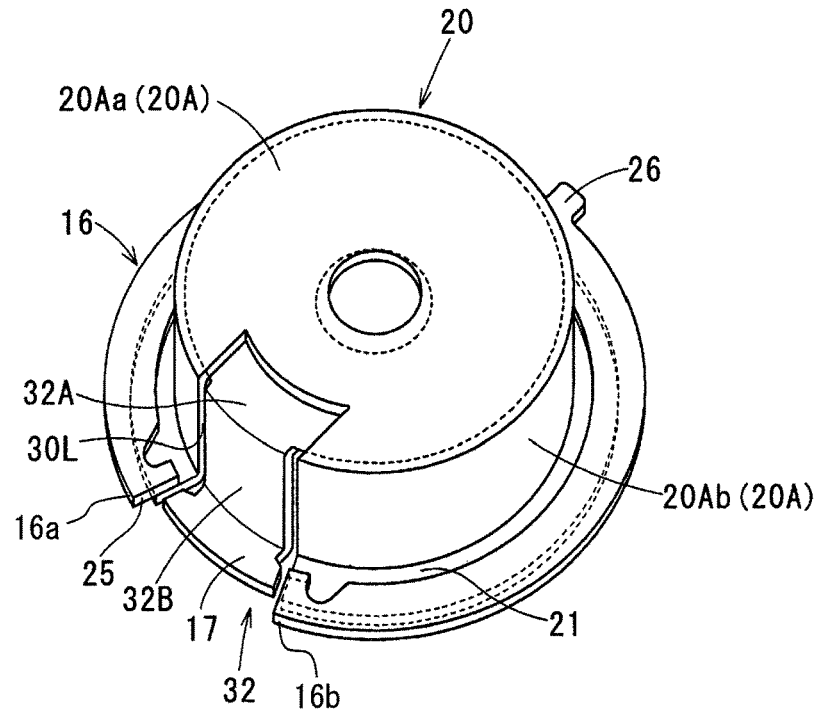
FIG. 24 is a perspective view of a cover and a snap ring according to the fourth embodiment.
Figure 25:
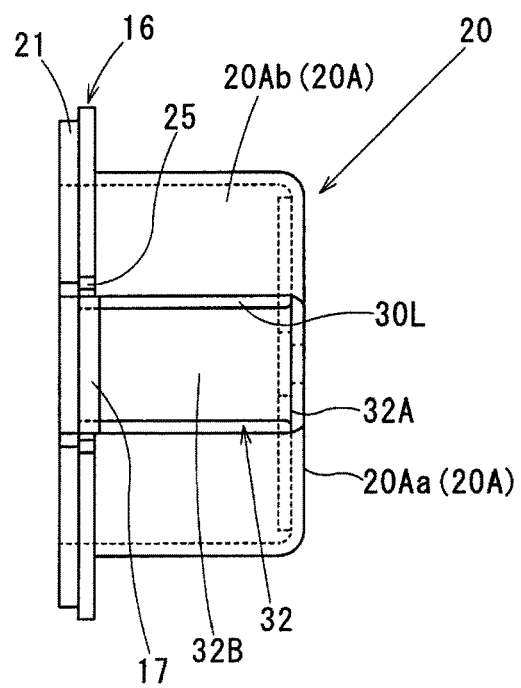
FIG. 25 is a side view of the cover and the snap ring according to the fourth embodiment.

In this way, the inside of the tubular portion 19 can be opened to an outside of the tubular portion 19 through two openings 29a, 29b (see FIG. 16) formed at two locations, i.e., the location around the limiting portion 17 and the location around the projection 26 (see FIGS. 12 to 15). Therefore, for example, in an intermediate state where the piston 14 is not in contact with the cover 20 and is thereby located between the bottom 19c of the tubular portion 19 and the cover 20, the hydraulic oil flows into the inside (the spring chamber 24) of the tubular portion 19 through the openings 29a, 29b at the above-described locations. Then, in response to the movement of the piston 14 toward the one axial end side, the hydraulic oil, which is present in the inside (the spring chamber 24) of the tubular portion 19, is progressively pressurized and is discharged to the outside of the tubular portion 19 through the openings 29a, 29b. At this time, foreign objects (contaminants) F, which have been previously introduced into the inside (the spring chamber 24) of the tubular portion 19 through the openings 29a, 29b, can be advantageously discharged to the outside through at least one of the openings 29a, 29b along with the hydraulic oil (see FIGS. 16 and 17). FIG. 17 illustrates the discharging of the foreign objects F through the opening 29b.

As discussed above, the hydraulic oil can be guided into the inside (the spring chamber 24) of the tubular portion 19 and can be discharged to the outside of the tubular portion 19. Therefore, the foreign objects F, which are accumulated in the inside of the tubular portion 19, can be washed out with the hydraulic oil.

Third Embodiment

A hydraulic accumulator 1 according to a third embodiment will be described mainly with respect to differences relative to the hydraulic accumulators 1 of the first and second embodiments.

In the hydraulic accumulator 1 of the third embodiment, the limiting portion 17, which is discontinuous to the rest of the flange 21 in the circumferential direction, is formed as follows. Specifically, a slit 30 is formed at each of two locations, which are circumferentially spaced from each other, at the flange 21 and a peripheral wall 20Ab of the main body 20A. Then, a portion of the flange 21, which is circumferentially located between the two slits 30, is bent toward the one axial end side, to form the limiting portion 17 (see FIGS. 18 to 21).

In this way, advantages, which are similar to those of the hydraulic accumulator 1 of the second embodiment, can be achieved. Furthermore, since the hydraulic oil can more easily flow into the inside (the spring chamber 24) of the tubular portion 19 in comparison to the hydraulic accumulator 1 of the second embodiment, it is possible to enhance the washing out of the foreign objects F.

Fourth Embodiment

A hydraulic accumulator 1 according to a fourth embodiment will be described mainly with respect to differences relative to the hydraulic accumulators 1 of the first to third embodiments.

In the hydraulic accumulator 1 of the fourth embodiment, the limiting portion 17 is formed at a component 32, which is formed separately from the cover 20 (see FIGS. 22 to 25). Here, the component 32 is made by bending a metal material, which is in a plate form. The component 32 includes a main body 32A and a side wall 32B besides the limiting portion 17.

First of all, the main body 32A is placed on the other axial end side of the bottom 20Aa and forms a spring seat on the one axial end side of the spring 15. The main body 32A contacts the bottom 20Aa. Furthermore, the side wall 32B is bent relative to the main body 32A by generally 90 degrees and is placed generally parallel to the peripheral wall 20Ab. The limiting portion 17 is formed by bending a distal end part of the side wall 32B toward the radially outer side by generally 90 degrees. Here, a slit 30L, which is wide in the circumferential direction, is formed at both of the flange 21 and the peripheral wall 20Ab. The side wall 32B is received in one portion of the slits 30L, which is formed in the peripheral wall 20Ab. Furthermore, the limiting portion 17 is placed on the one axial end side of another portion of the slit 30L, which is formed in the flange 21.

Thereby, similar to the hydraulic accumulators 1 of the first to third embodiments, according to the present embodiment, the limiting portion 17 is fitted into the ring end gap 25 of the snap ring 16 to limit the decrease in the diameter of the snap ring 16, which is caused by the radial contraction of the snap ring 16. Thus, it is possible to limit the riding of the sloped surface 16a on the corner 27a of the groove 27, and thereby it is possible to limit the removal of the snap ring 16 from the groove 27.

Modifications

The present disclosure should not be limited to the above embodiments, and the above embodiments may be modified in various forms.

For example, in the hydraulic accumulators 1 of the above embodiments, the cover 20 has the flange 21 that contacts the snap ring 16. Alternatively, the cover 20 may be shaped into a circular disk plate form, and an outer peripheral portion of the cover 20 may be placed in contact with the snap ring 16.

Additional advantages and modifications will readily occur to those skilled in the art. The present disclosure in its broader terms is therefore not limited to the specific details, representative apparatus, and illustrative examples shown and described. Some or all of the features of any one or more of the embodiments described above may be combined with some or all of the features of another one or more of the embodiments described above within the principle of the present disclosure.

What is claimed is:

1. A hydraulic accumulator to be connected to an oil passage, which is configured to supply an oil pressure to a friction element of a transmission of a vehicle, while the hydraulic accumulator is configured to accumulate the oil pressure supplied from the oil passage, the hydraulic accumulator comprising:
    a housing that includes a tubular portion, which opens at one axial end side;
    a cover that closes the tubular portion at the one axial end side;
    a piston that is received in an inside of the tubular portion in a manner that enables movement of the piston in an axial direction, wherein the piston forms an oil pressure chamber, which is configured to accumulate the oil pressure, at another axial end side, which is opposite from the one axial end side;
    a spring that is interposed between the cover and the piston to urge the piston toward the another axial end side;
    a snap ring that is fitted into a circumferential groove, which is formed at an inner peripheral wall of the tubular portion, wherein the cover is urged by the spring toward the one axial end side to contact the snap ring through an outer peripheral portion of the cover, so that removal of the cover from the tubular portion is limited; and
    a limiting portion that is fitted into a ring end gap of the snap ring and is configured to limit a decrease in a diameter of the snap ring.

2. The hydraulic accumulator according to claim 1, wherein:
    the cover is shaped into a cup form and has a flange that contacts the snap ring;
    a portion of the flange is continuous with a rest of the flange in a circumferential direction and is raised toward the one axial end side; and
    the portion of the flange forms the limiting portion.

3. The hydraulic accumulator according to claim 1, wherein:
    the cover is shaped into a cup form and has a flange that contacts the snap ring;

a portion of the flange is discontinuous to a rest of the flange in a circumferential direction and is raised toward the one axial end side; and the portion of the flange forms the limiting portion.

4. A manufacturing method of a hydraulic accumulator to be connected to an oil passage, which is configured to supply an oil pressure to a friction element of a transmission of a vehicle, while the hydraulic accumulator is configured to accumulate the oil pressure supplied from the oil passage, the hydraulic accumulator including:
- a housing that includes a tubular portion, which opens at one axial end side;
- a cover that closes the tubular portion at the one axial end side;
- a piston that is received in an inside of the tubular portion in a manner that enables movement of the piston in an axial direction, wherein the piston forms an oil pressure chamber, which is configured to accumulate the oil pressure, at another axial end side, which is opposite from the one axial end side;
- a spring that is interposed between the cover and the piston to urge the piston toward the another axial end side;
- a snap ring that is fitted into a circumferential groove, which is formed at an inner peripheral wall of the tubular portion, wherein the cover is urged by the spring toward the one axial end side to contact the snap ring through an outer peripheral portion of the cover, so that removal of the cover from the tubular portion is limited; and
- a limiting portion that is fitted into a ring end gap of the snap ring and is configured to limit a decrease in a diameter of the snap ring, the manufacturing method comprising:

forming the limiting portion by deforming a portion of the cover.

5. The manufacturing method according to claim 4, wherein the cover is shaped into a cup form and has a flange that contacts the snap ring, wherein the manufacturing method comprising forming the limiting portion by raising a portion of the flange toward the one axial end side through press working.

* * * * *